(12) United States Patent
Haney et al.

(10) Patent No.: US 12,193,610 B2
(45) Date of Patent: Jan. 14, 2025

(54) DRIVE ASSEMBLY FOR AN APPLIANCE

(71) Applicant: WHIRLPOOL CORPORATION, Benton Harbor, MI (US)

(72) Inventors: Edward Haney, Baroda, MI (US); Ryan Ebstein, San Francisco, CA (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 573 days.

(21) Appl. No.: 17/403,946

(22) Filed: Aug. 17, 2021

(65) Prior Publication Data
US 2023/0055220 A1 Feb. 23, 2023

(51) Int. Cl.
*A47J 43/08* (2006.01)
*F16H 3/00* (2006.01)

(52) U.S. Cl.
CPC ............ *A47J 43/085* (2013.01); *F16H 3/005* (2013.01)

(58) Field of Classification Search
CPC ............ A47J 43/085; F16H 2200/2005; F16H 2200/2071; F16H 2200/2038; F16H 3/005
USPC ........................................................ 366/279
See application file for complete search history.

(56) References Cited

U.S. PATENT DOCUMENTS

| | | |
|---|---|---|
| 5,531,651 A | 7/1996 | Yang |
| 5,881,609 A | 3/1999 | Palmer |
| 6,484,608 B1 | 11/2002 | Ziavras |
| 8,506,437 B2 | 8/2013 | Cheung et al. |
| 8,661,943 B2 * | 3/2014 | Cheung ................. A47J 43/085 74/665 F |
| 9,211,028 B2 * | 12/2015 | Cheung ................. A47J 43/085 |
| 9,994,305 B1 | 6/2018 | Moldovan |
| 10,458,520 B2 | 10/2019 | Brunner et al. |
| 11,266,270 B2 * | 3/2022 | Hammond ............ A47J 43/046 |
| 2012/0071293 A1 * | 3/2012 | Cheung ................. A47J 43/085 475/331 |
| 2012/0167712 A1 * | 7/2012 | Cheung ................... A47J 43/08 74/650 |
| 2015/0009776 A1 * | 1/2015 | Cheung ................. A47J 43/082 366/129 |
| 2015/0011348 A1 * | 1/2015 | Vester ..................... B01F 29/10 475/175 |
| 2016/0100716 A1 * | 4/2016 | Cheung ................. A47J 43/044 366/129 |
| 2017/0037947 A1 * | 2/2017 | Park ........................ F16H 3/724 |
| 2017/0050700 A1 * | 2/2017 | Lemmens ................ B62M 6/45 |
| 2018/0149238 A1 * | 5/2018 | Brunner ................ A47J 43/085 |

(Continued)

*Primary Examiner* — Colby M Hansen
(74) *Attorney, Agent, or Firm* — Price Heneveld LLP

(57) ABSTRACT

A drive assembly for a blender appliance includes an output drive shaft and an inner one-way bearing member received in an interior cavity of the output drive shaft. An outer bearing member is oppositely configured relative to the inner one-way bearing member and includes a receiving bore. The receiving well of the output drive shaft is received in the receiving bore of the outer one-way bearing member. An input drive shaft includes a first end received in a receiving bore of the inner one-way bearing member. A planetary gear system includes a sun gear that is operably coupled to the input drive shaft and gearingly engaged with a ring gear through a plurality of planet gears. A carrier member is operably coupled to the plurality of planet gears and includes a receiving bore in which the outer one-way bearing member is received for rotation therewith.

20 Claims, 13 Drawing Sheets

(56) References Cited

U.S. PATENT DOCUMENTS

2018/0338643 A1* 11/2018 Hammond ............ A47J 43/046
2019/0029457 A1* 1/2019 Zhao ....................... A47J 19/02

* cited by examiner

DRIVE ASSEMBLY FOR AN APPLIANCE

BACKGROUND OF THE DISCLOSURE

The present disclosure generally relates to a drive assembly, and more specifically, to a multiple-speed drive assembly for an appliance.

SUMMARY OF THE DISCLOSURE

According to one aspect of the present disclosure, a drive assembly includes an output drive shaft having a receiving well with an outer surface and an interior cavity. An inner bearing member is received in the interior cavity of the output drive shaft. The inner bearing member is a one-way bearing member having a receiving bore. An outer bearing member includes a receiving bore. The receiving well of the output drive shaft is received in the receiving bore of the outer bearing member. The outer bearing member is a one-way bearing member that is oppositely configured relative to the inner bearing member. An input drive shaft includes first and second portions. The first portion is received in the receiving bore of the inner bearing member. A planetary gear system includes a sun gear that is operably coupled to the second portion of the input drive shaft and is gearingly engaged with a ring gear through a plurality of planet gears. A carrier member is operably coupled to the plurality of planet gears for rotation therewith. The carrier member includes a receiving bore in which the outer bearing member is received for rotation therewith.

According to another aspect of the present disclosure, a drive assembly includes an output drive shaft configured for rotation in opposed first and second directions. The output drive shaft includes first and second portions. The second portion of the output drive shaft includes a receiving well defined by a sidewall with inner and outer surfaces surrounding a hollow interior cavity. A first bearing member is received within the hollow interior cavity of the output drive shaft. The first bearing member includes an outer race operably coupled to the inner surface of the sidewall of the second portion of the output drive shaft for rotation therewith. The first bearing member includes a receiving bore. An input drive shaft includes first and second portions. The first portion of the input drive shaft is received in the receiving bore of the first bearing member for rotation therein in opposed first and second directions. The first portion of the input drive shaft spins freely within the receiving bore of the first bearing member when the input drive shaft rotates in the first direction. The input drive shaft directly drives rotation of the first bearing member when the input drive shaft rotates in the second direction. A second bearing member includes an outer race surrounding a receiving bore. The second bearing member is operable for rotation between opposed first and second directions. The second portion of the output drive shaft is received within the receiving bore of the second bearing member for rotation therein. The second portion of the output drive shaft spins freely within the receiving bore of the second bearing member when the second bearing member and the output drive shaft rotate in the second direction. The second bearing member drives rotation of the output drive shaft when the second bearing member rotates in the first direction.

According to yet another aspect of the present disclosure, an output drive shaft includes a receiving well with a hollow interior cavity that is defined by a sidewall having inner and outer surfaces. A first one-way bearing is received in the hollow interior cavity of the output drive shaft. The first one-way bearing includes a receiving bore. An outer surface of the first one-way bearing is engaged with the inner surface of the sidewall of the output drive shaft for rotation therewith. A second one-way bearing includes a receiving bore. The receiving well of the output drive shaft is received within the receiving bore of the second one-way bearing. An input drive shaft includes an upper portion thereof received in the receiving bore of the first one-way bearing. The input drive shaft is configured for rotation in opposed first and second directions. The first one-way bearing drives rotation of the output drive shaft at a first rotational speed when the input drive shaft rotates in the second direction. The second one-way bearing drives rotation of the output drive shaft at a second rotational speed which is less than the first rotational speed when the input drive shaft rotates in the first direction.

These and other features, advantages, and objects of the present disclosure will be further understood and appreciated by those skilled in the art by reference to the following specification, claims, and appended drawings.

Figure 1:
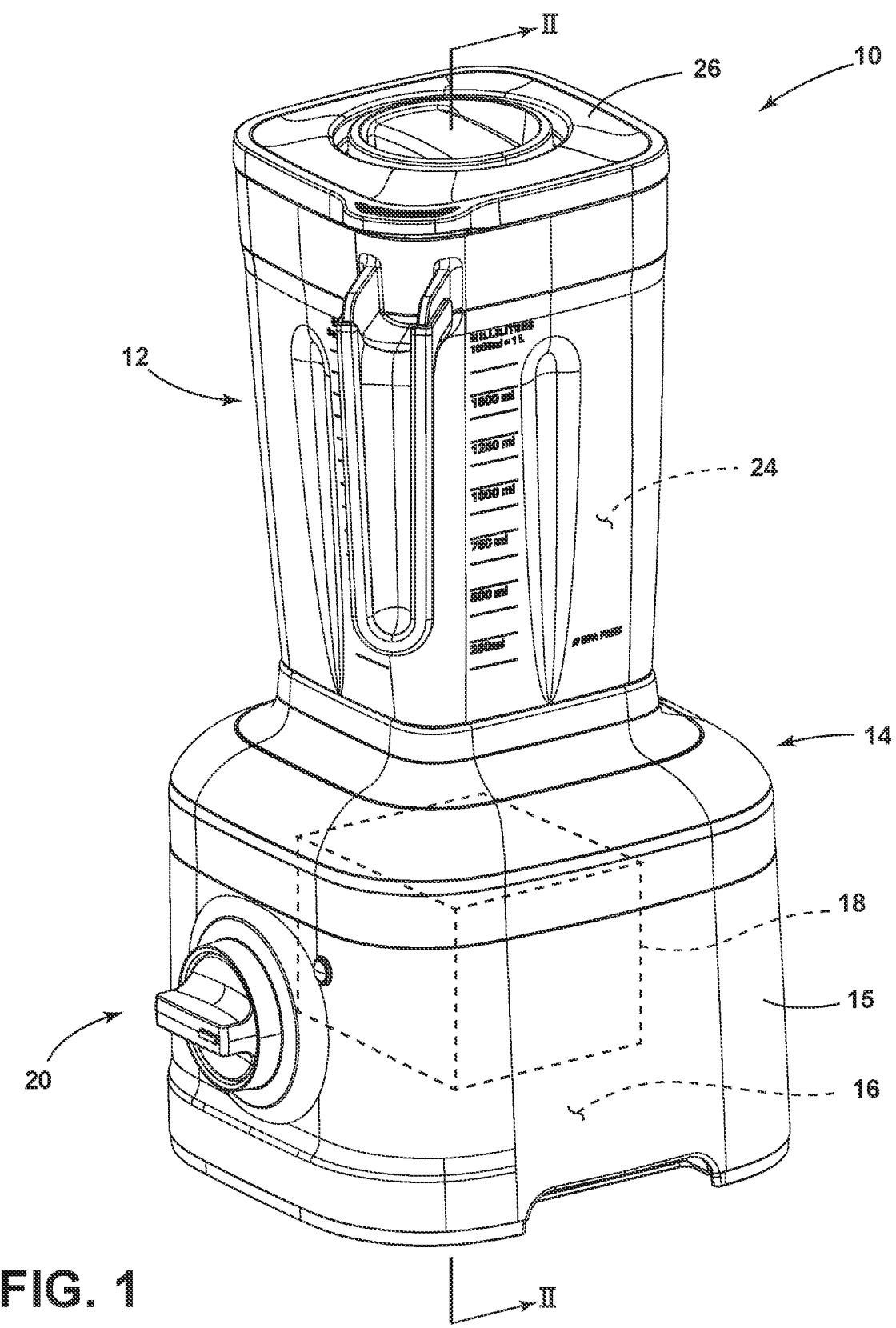
FIG. 1 is a top perspective view of an appliance configured for use with the present concept.

The components in the figures are not necessarily to scale, emphasis instead being placed upon illustrating the principles described herein.

DETAILED DESCRIPTION

The present illustrated embodiments reside primarily in combinations of method steps and apparatus components related to a drive assembly for an Appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, reference numeral 10 generally designates a small appliance in the form of a blender. The blender 10 is contemplated for use with the present concept. The blender 10, as shown in FIG. 1, includes a blender jar 12 that is selectively supported on a base unit 14. The blender jar 12 includes an inner cavity 24 and a lid assembly 26 disposed on an open top thereof. The base unit 14 includes a sidewall 15 surrounding an interior cavity 16. A motor 18 is housed within the interior cavity 16 of the base unit 14. In use, the motor 18 is configured to drive a blade assembly 22 (FIG. 2) associated with the blender jar 12. As further shown in FIG. 1, the blender 10 includes a user interface 20 in the form of a knob that is electronically coupled to the motor 18, and configured to adjust various settings of the motor 18.

Figure 2:
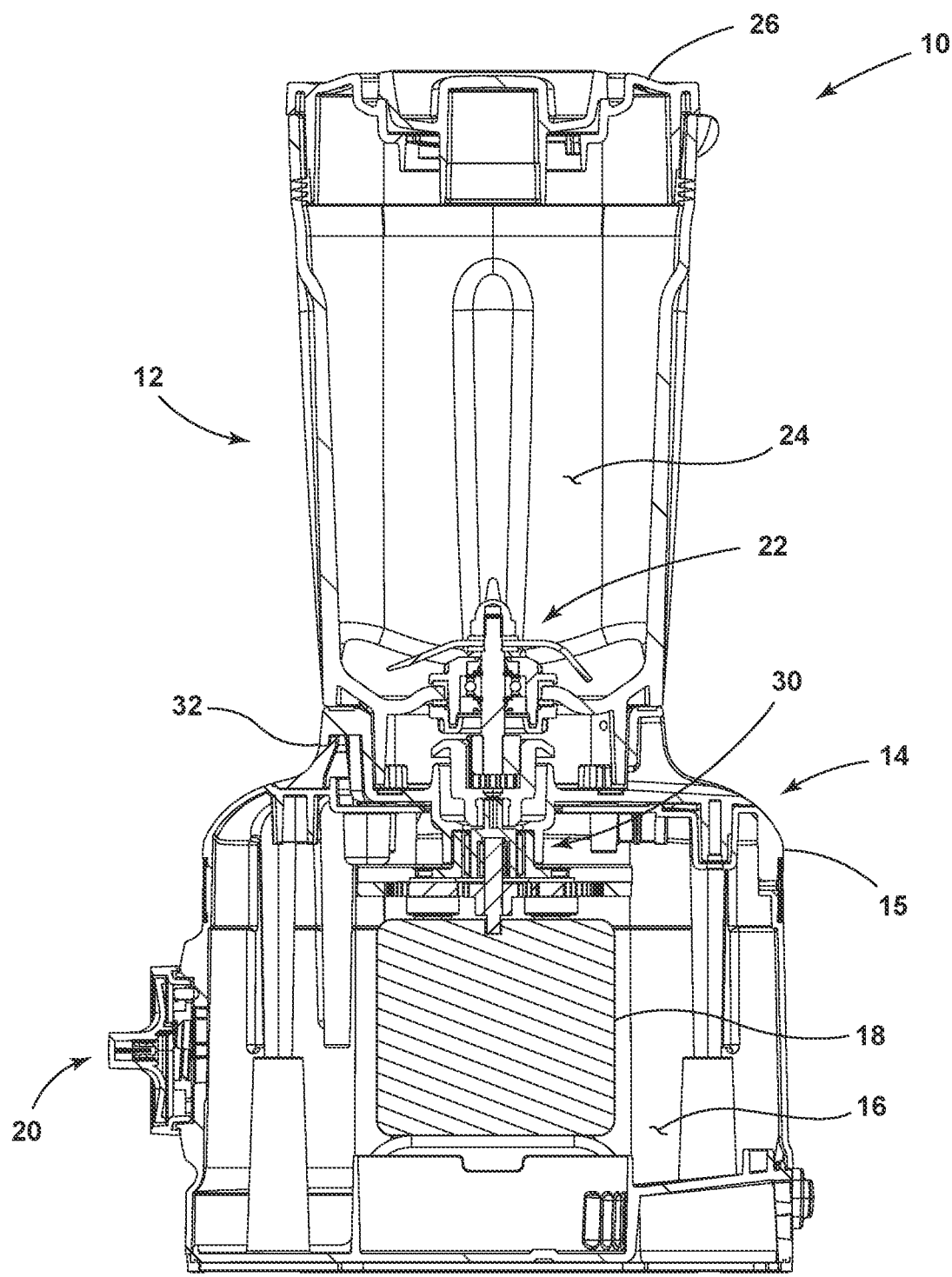
FIG. 2 is a cross-sectional view of the appliance of FIG. 1 taken along line II.

Referring now to FIG. 2, a cross-sectional view of the blender 10 shows the motor 18 disposed within the interior cavity 16 of the base unit 14. The motor 18 is interconnected to the blade assembly 22 by a drive assembly 30. In use, the drive assembly 30 is driven by the motor 18, and translates an input from the motor 18 to the blade assembly 22 within the inner cavity 24 of the blender jar 12, for running the blade assembly 22 at multiple speeds, as further described below. As shown in FIG. 2, drive assembly 30 is surrounded by a drive housing 32 which is disposed on an upper portion of the base unit 14 and configured to receive the blender jar 12 thereon.

Figure 3:
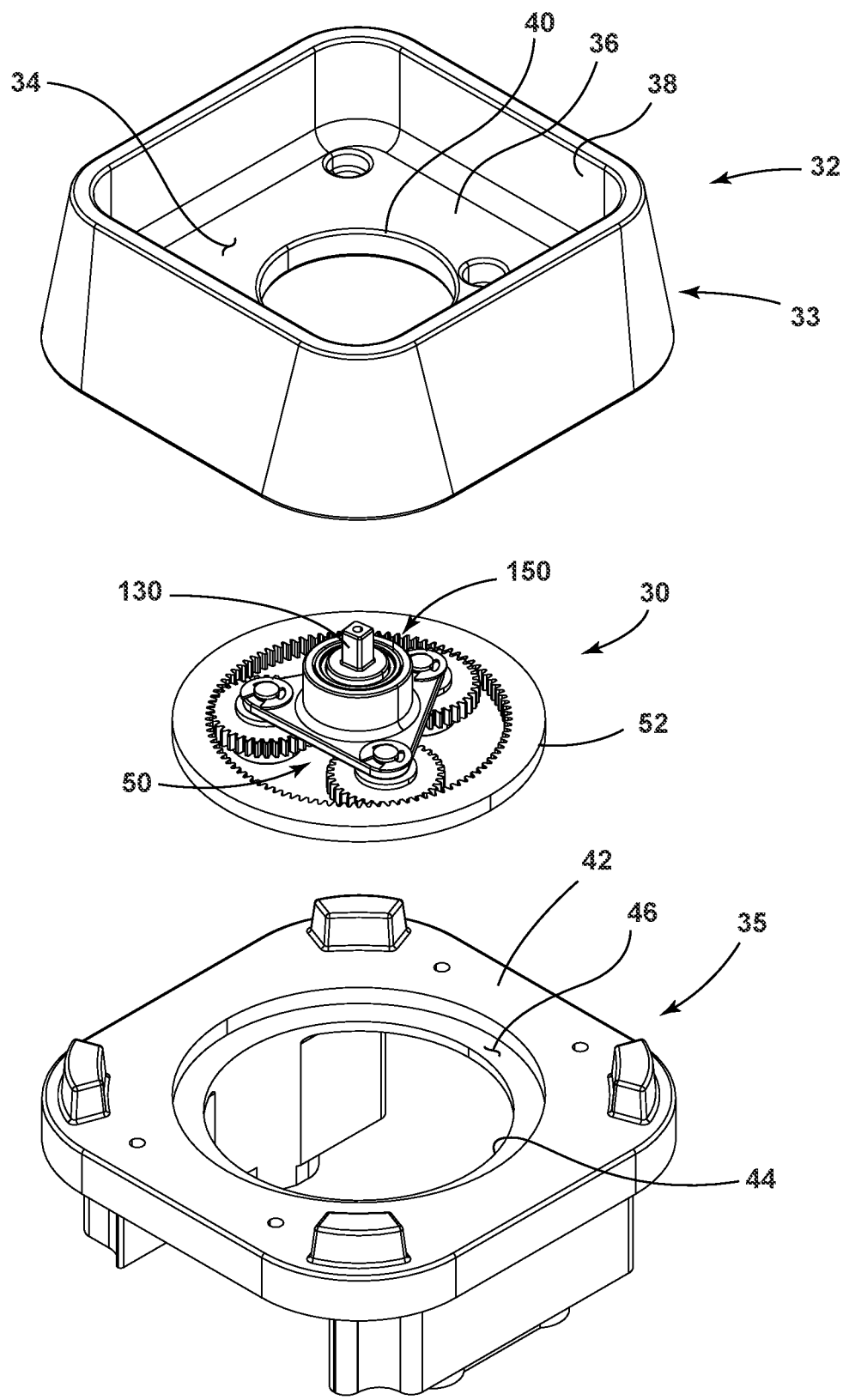
FIG. 3 is an exploded top perspective view of a drive housing having a drive assembly.

Referring now to FIG. 3, the drive housing 32 is shown with an upper portion 33 having an upwardly opening cavity 34. The upwardly opening cavity 34 is configured to receive a base portion of the blender jar 12. The upwardly opening cavity 34 is defined by a bottom wall 36 having an upwardly extending surrounding sidewall 38. An access aperture 40 is disposed through the bottom wall 36. The drive assembly 30 is shown exploded away from the upper portion 33 in the baseplate 35 of the drive housing 32. The drive assembly 30 is described in more detail below, but is shown in FIG. 3 as having a bearing assembly 150 and a gear system 50. The baseplate 35 is shown exploded away from the drive assembly 30 and includes an upper wall 42 having an access aperture 44 disposed therethrough. The upper wall 42 of the baseplate 35 further includes a shouldered support portion 46 which is configured to receive a ring gear 52 of the gear system 50, when the gear system 50 is a planetary gear system. In this way, is contemplated that the drive assembly 30 is positively captured between the upper portion 33 and the baseplate 35 of the drive housing 32 in assembly.

Figure 4:
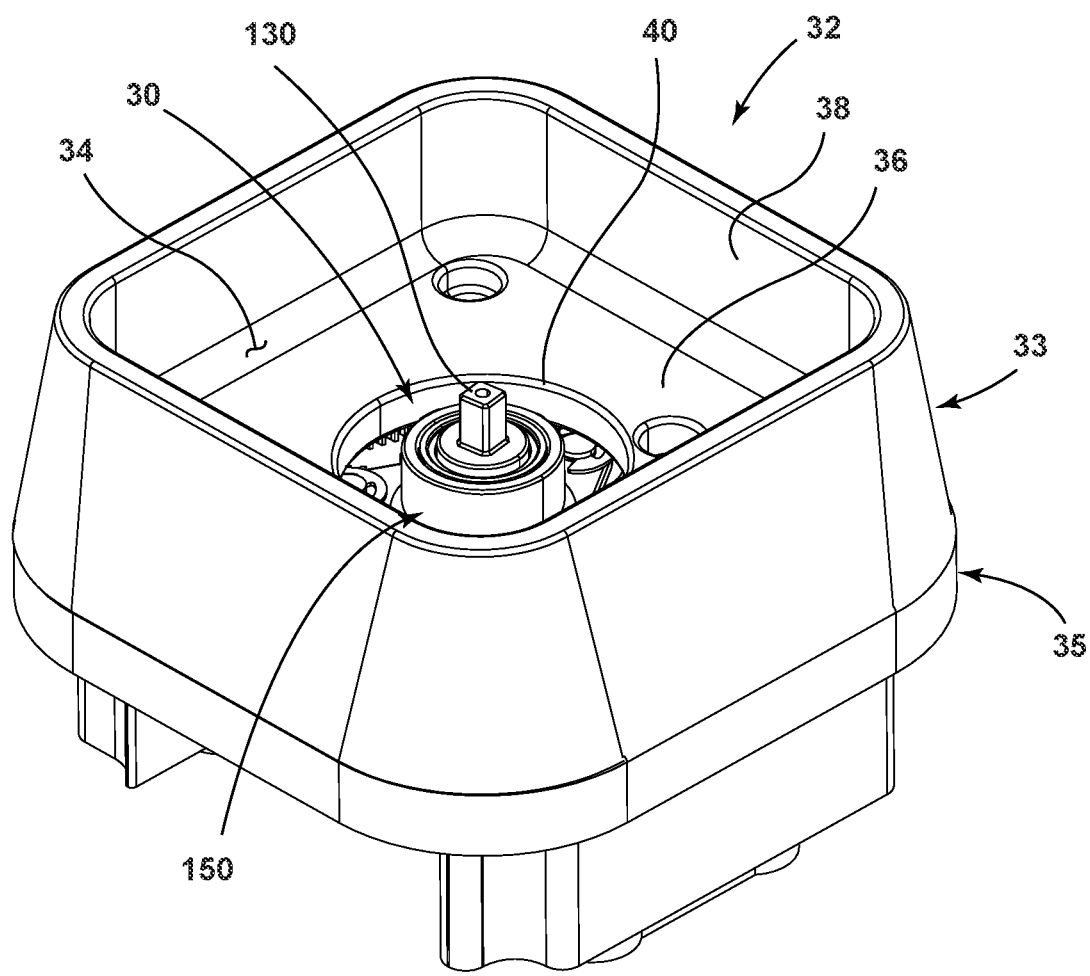
FIG. 4 is a top perspective view of the drive housing of FIG. 3 assembled around the drive assembly of FIG. 3.

Referring now to FIG. 4, the drive housing 32 is shown from a top perspective view, wherein a portion of the bearing assembly 150 extends through the access aperture 40 of the upper portion 33 of the drive housing 32. The portion of the bearing assembly 150 extending through the access aperture 40 of the upper portion 33 of the drive housing 32 is configured to engage a coupling portion of the blender jar 12. Specifically, an output drive shaft 130 is shown extending through the access aperture 40. In use, the output drive shaft 130 is operably coupled to the blade assembly 22 (FIG. 2) of the blender jar 12 to drive the same when the blender jar 12 is received on the upwardly opening cavity 34 of the drive housing 32.

Figure 5:
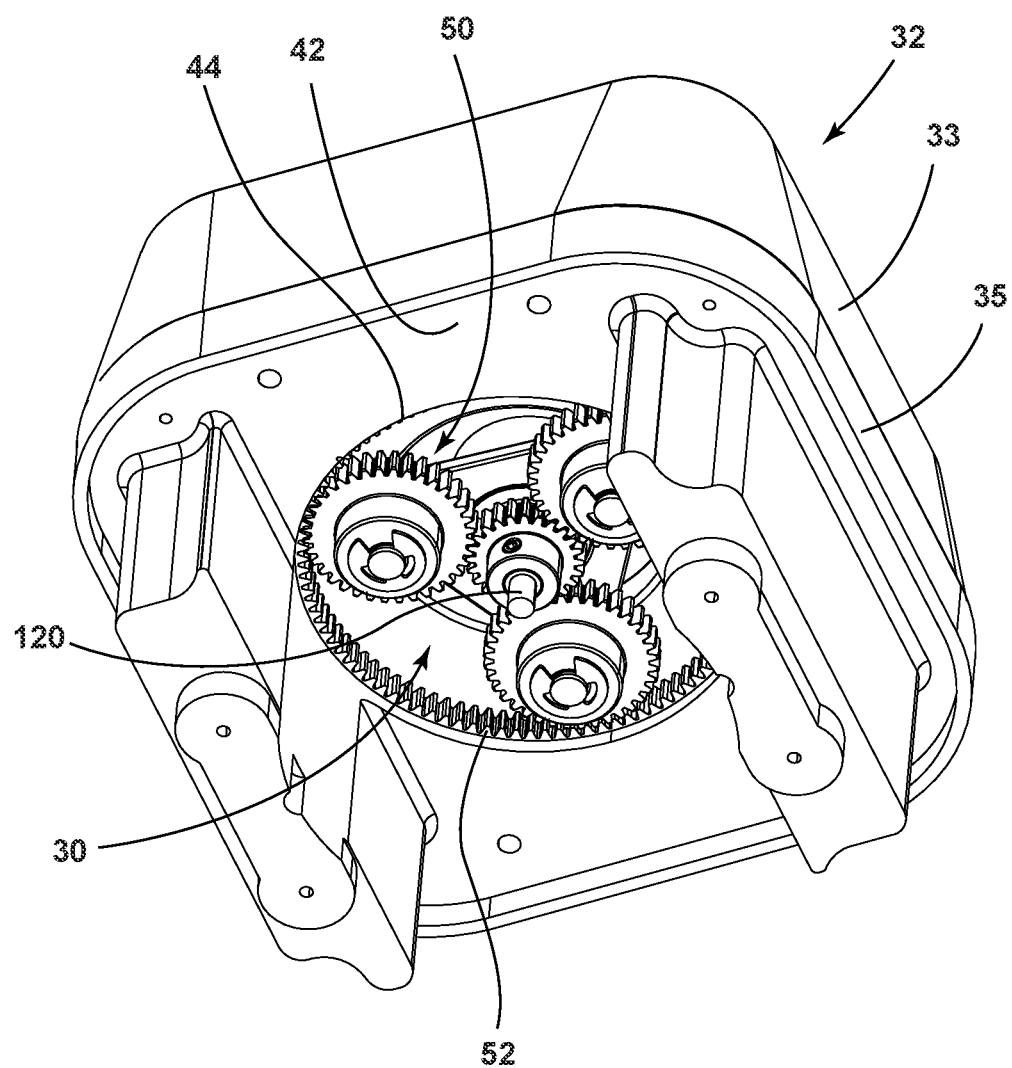
FIG. 5 is a bottom perspective view of the drive housing of FIG. 3 assembled around the drive assembly of FIG. 3.

Referring now to FIG. 5, the drive housing 32 is shown from a bottom perspective view, wherein the planetary gear system 50 of the drive assembly 30 is shown. The ring gear 52 of the planetary gear system 50 is shown disposed around the access aperture 44 that is disposed through the upper wall 42 of the baseplate 35 of the drive housing 32. The ring gear 52 is contemplated to be a stationary member as captured between the upper portion 33 and baseplate 35 of the drive housing 32. As further shown in FIG. 5, an input drive shaft 120 is shown extending downwardly from the access aperture 44, and is configured to couple to the motor 18 of the blender 10, such that the motor 18 can drive the input drive shaft 120 in opposed first and second directions. The rotational speed provided by the motor 18 to the input drive shaft 120 may be the same for both the first and second directions of rotation. Powering the input drive shaft 120 further drives the output drive shaft 130 at various speeds and at various torque levels in the first and second directions, as further described below.

Figure 6:
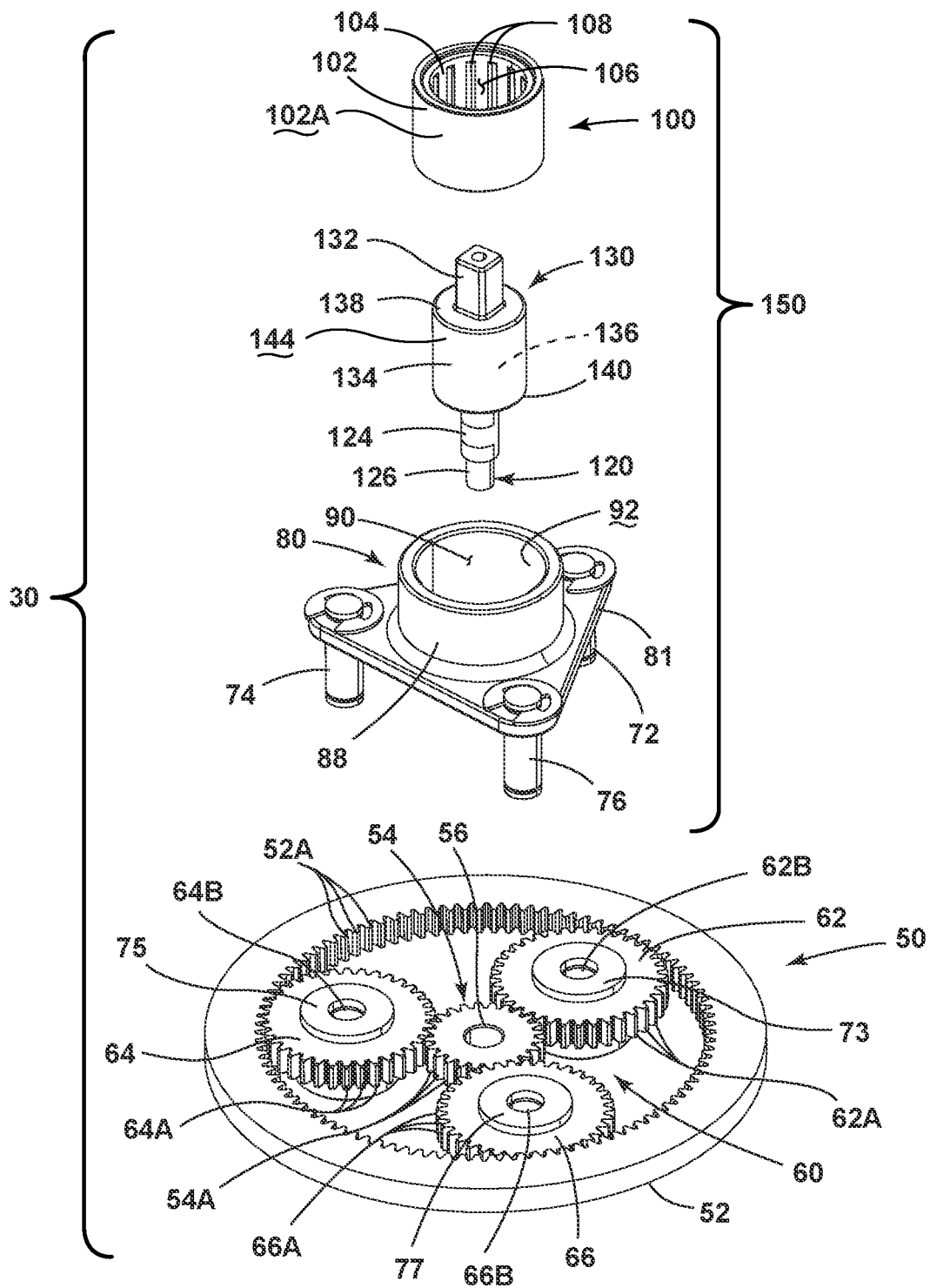
FIG. 6 is an exploded top perspective view of a bearing assembly exploded away from a gear system.
Figure 7:
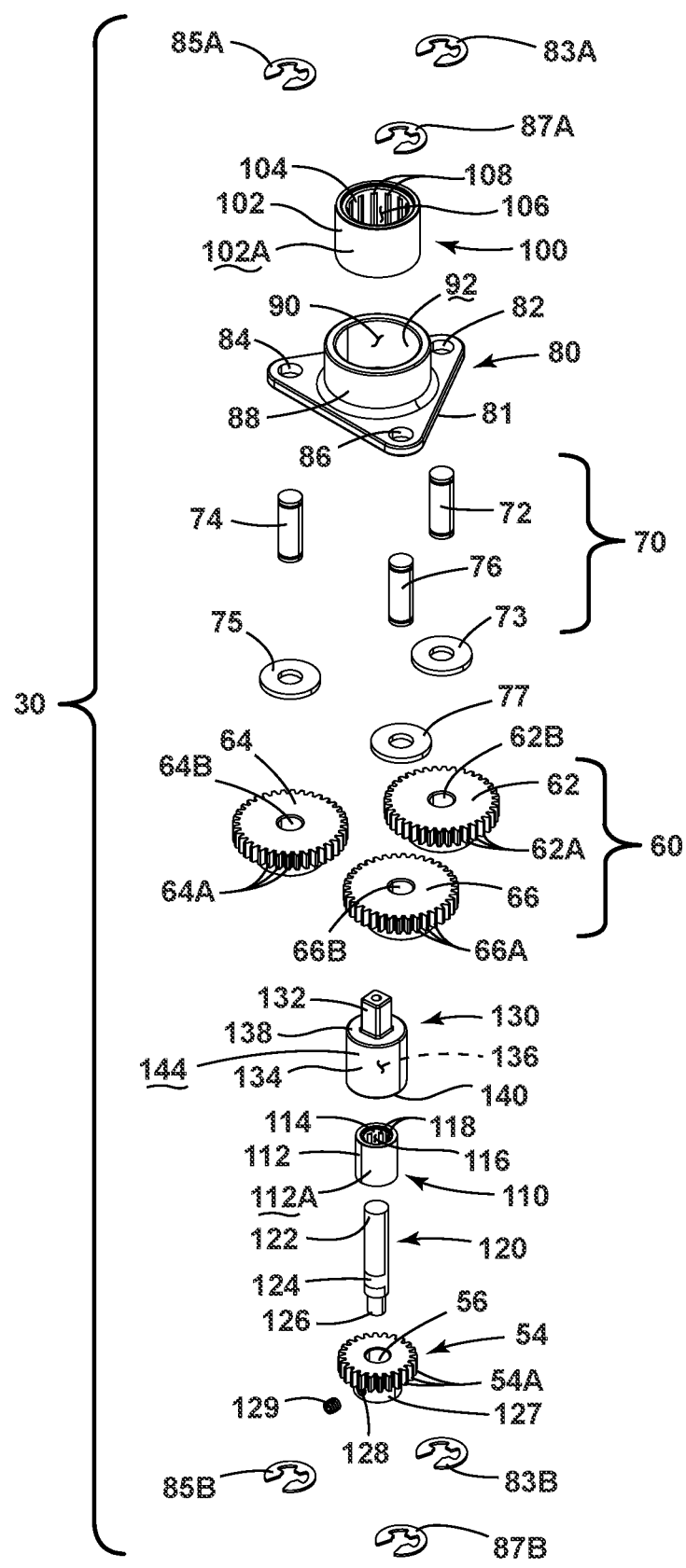
FIG. 7 is an exploded top perspective view of a drive assembly.

Referring now to FIGS. 6 and 7, the drive assembly 30 is shown in various exploded views to different extents. The planetary gear system 50 is shown with the ring gear 52 thereof having a plurality of inwardly extending teeth 52A. The planetary gear system 50 further includes a centrally disposed sun gear 54. The sun gear 54 is gearingly engaged with the ring gear 52 by a plurality of planet gears 60 shown in the form of planet gears 62, 64 and 66. The planet gears 62, 64 and 66 are toothed gear rings that include outwardly extending teeth 62A, 64A and 66A, respectively. Similarly, the sun gear 54 includes outwardly extending teeth 54A as well as a centrally disposed aperture 56. The teeth 52A, 54A, 62A, 64A and 66A of the respective component parts of the planetary gear system 50 are configured to be complementary to one another, such that the associated gears (ring gear 52, sun gear 54, and planetary gears 62, 64 and 66) engage one another and are interconnected in a gearingly engaged relationship, as best shown in FIG. 6 and further described below. The planet gears 62, 64 and 66 each include a centrally disposed aperture 62B, 64B and 66B, respectively.

Each centrally disposed aperture 62B, 64B and 66B is configured to receive a connecting rod 72, 74 and 76, respectively, from a plurality of connecting rods 70. Washers 73, 75, and 77 may be received on the each connecting rod 72, 74 and 76, respectively. In use, the connecting rods 72, 74 and 76 are configured to connect the planet gears 62, 64 and 66 with a carrier member 80. Specifically, the carrier member 80 includes a plate portion 81 having apertures 82, 84 and 86 disposed therethrough. In assembly, the connecting rods 72, 74 and 76 are received through the apertures 82, 84 and 86 of the plate portion 81 of the carrier member 80. In this way, the connecting rods 72, 74 and 76 interconnects the planet gears 62, 64 and 66 with the carrier member 80. As further shown in FIG. 7, upper clips 83A, 85A and 87A and lower clips 83B, 85B and 87B are configured to couple to the connecting rods 72, 74 and 76 to hold the same in place on the carrier member 80 and the planet gears 62, 64 and 66, respectively. As further shown in FIGS. 6 and 7, the carrier member 80 includes a cylindrical portion 88 upwardly extending from the plate portion 81 to define a receiving bore 90 having an inner surface 92. The inner surface 92 of the cylindrical portion 88 of the carrier member 80 defines a bearing surface for the carrier member 80. The receiving bore 90 of the carrier member 80 is configured to receive a bearing member 100 therein.

Figure 14:
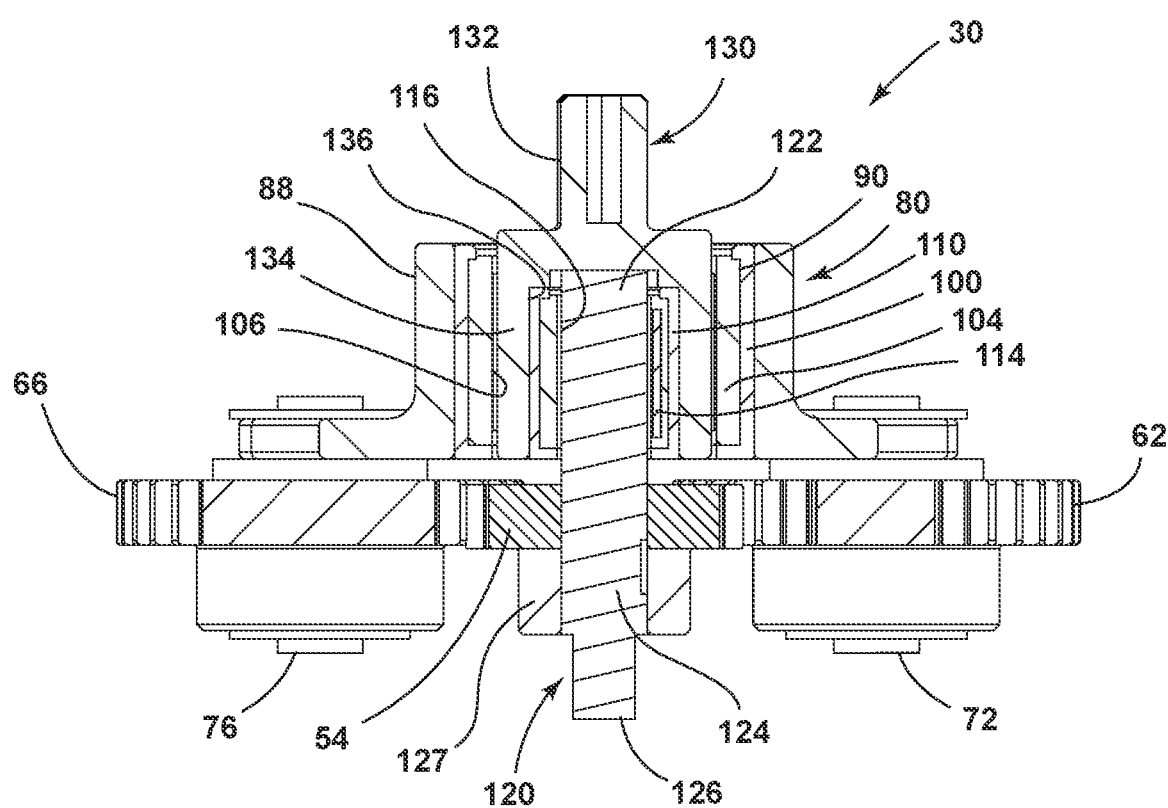
FIG. 14 is a cross-section view of the drive assembly of FIG. 10, taken at line XIV.

With further reference to FIGS. 6 and 7, the bearing assembly 150 includes the bearing member 100. The bearing member 100 is contemplated to be a one-way bearing, as further described below. The bearing member 100 may be referred to herein as an outer bearing member or second bearing member, as compared to an inner bearing member or first bearing member described below. The bearing member 100 includes an outer race 102 having an outer surface 102A. The outer race 102 is a circular member surrounding a cylindrical clutch mechanism 104 which further surrounds an open receiving bore 106. In the embodiment shown in FIGS. 6 and 7, the bearing member 100 includes a plurality of sprags 108 which provide a clutch feature for the clutch mechanism 104. Other clutch mechanisms are also contemplated for use with the bearing member 100. As such, it is contemplated that the bearing member 100 is a one-way bearing that allows for free rotation of a rotating member received within the receiving bore 106 in one direction, but engages the rotating member when the rotating member rotates in an opposite direction. Said differently, when the rotating member rotates in one direction within the receiving bore 106 of the bearing member 100, the sprags 108 slip or free-wheel, but when a torque is applied in the opposite direction by the rotating member, the sprags tilt slightly, producing a wedging action that engages the bearing member 100 with the rotating member. Thus, the outer race 102 of the bearing member 100 can remain stationary when a rotating member rotates in a first direction, and will rotate with the rotating member when the bearing member 100 and the rotating member are engaged as the rotating member rotates in a second direction that is opposite of the first direction. In assembly, the bearing member 100 is received within the receiving bore 90 of the carrier member 80, as best shown in FIG. 14, such that the outer surface 102A of the outer race 102 engages the inner surface 92 of the cylindrical portion 88 of the carrier member 80 for rotation therewith. As used herein, the term "for rotation therewith" indicates that the parts described consistently rotate together, while the term "for rotation therein" indicates that the parts described may rotate together or may rotate separately at varying speeds in varying directions.

With further reference to FIGS. 6 and 7, the bearing assembly 150 includes another bearing member 110. The bearing member 110, much like bearing member 100 described above, is contemplated to be a one-way bearing, as further described below. The bearing member 110 may be referred to herein as an inner bearing member or first bearing member, as compared to the outer bearing member or second bearing member 100 described above. The bearing member 110 includes an outer race 112 having an outer surface 112A. The outer race 112 of the bearing member 110 is a circular member surrounding a cylindrical clutch mechanism 114 which further surrounds an open receiving bore 116. In the embodiment shown in FIGS. 6 and 7, the bearing member 110 includes a plurality of sprags 118 which provide a clutch feature for the clutch mechanism 114. Other clutch mechanisms are also contemplated for use with the bearing member 110. As such, it is contemplated that the bearing member 110 is a one-way bearing that allows for free rotation of a rotating member received within the receiving bore 116 in one direction, but engages the rotating member when the rotating member rotates in an opposite direction. Said differently, when the rotating member rotates in one direction within the receiving bore 116 of the bearing member 110, the sprags 118 slip or free-wheel, but when a torque is applied in the opposite direction by the rotating member, the sprags tilt slightly, producing a wedging action that engages the bearing member 110 with the rotating member. Thus, the outer race 112 of the bearing member 110 can remain stationary when a rotating member rotates in a first direction, and will rotate with the rotating member when the bearing member 110 and the rotating member are engaged as the rotating member rotates in a second direction that is opposite of the first direction.

Figure 12:
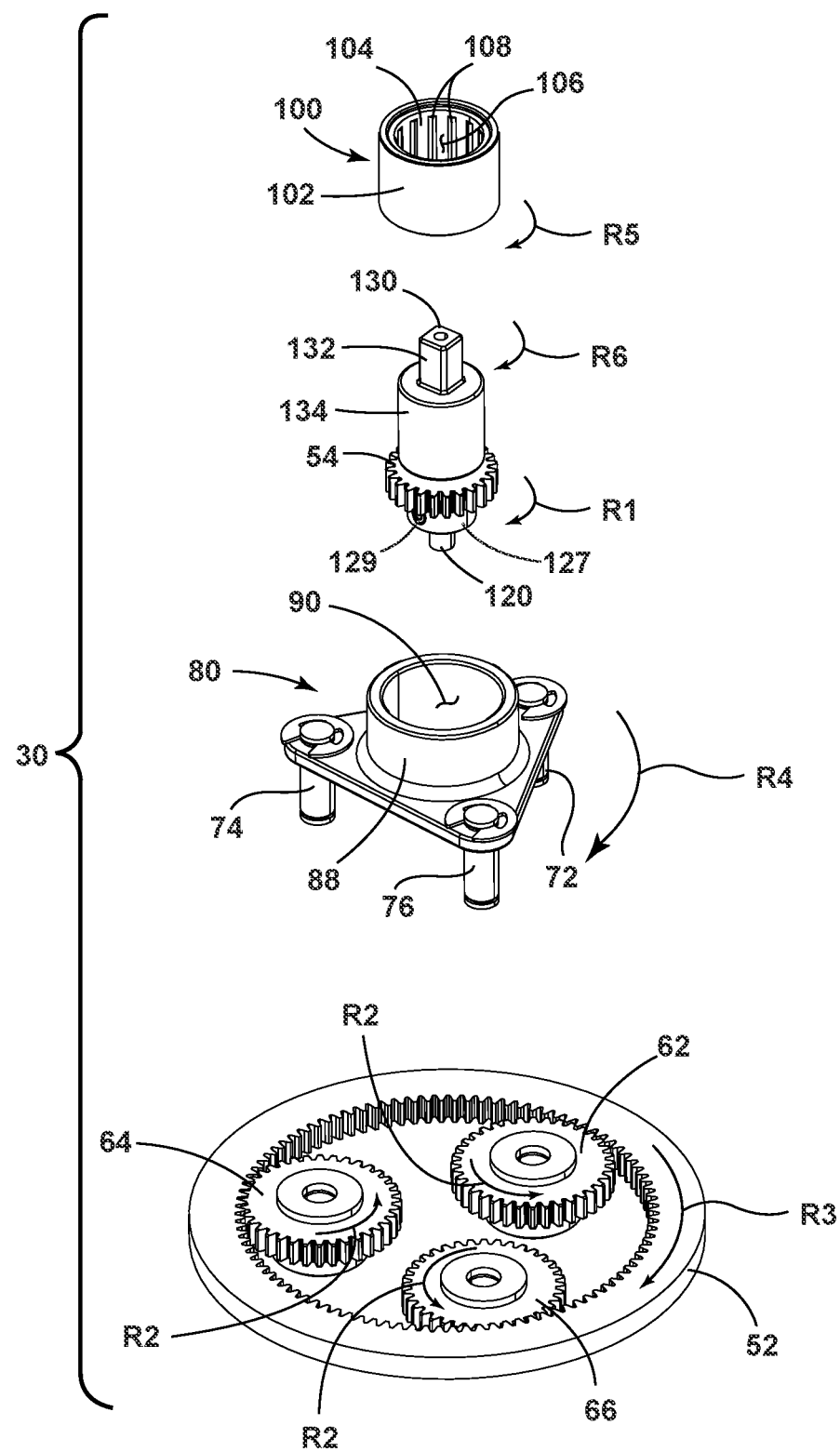
FIG. 12 is a top perspective view of the bearing assembly and gear system of FIG. 6 showing relative rotational movement of component parts thereof in an indirect drive configuration.
Figure 13:
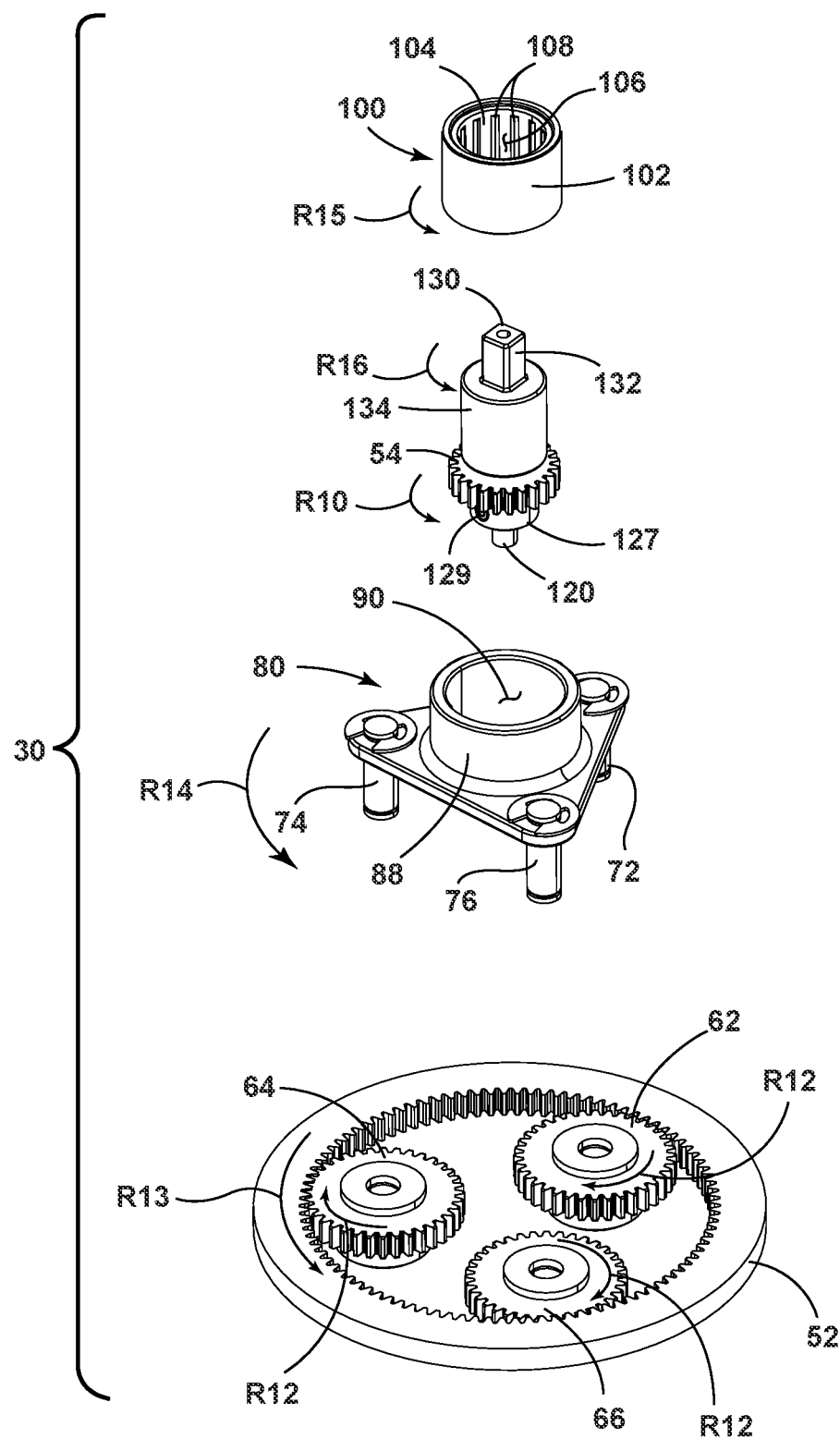
FIG. 13 is a top perspective view of the bearing assembly and gear system of FIG. 6 showing relative rotational movement of component parts thereof in a direct drive configuration.

With further reference to FIGS. 6 and 7, the bearing assembly 150 further includes the input drive shaft 120. The input drive shaft 120 includes first and second ends 122, 124 which may be referred to herein as first and second portions, upper and lower portions, or upper and lower engagement portions. The second end 124 of the input drive shaft 120 is received within the centrally disposed aperture 56 of the sun gear 54 for rotation therewith, as best shown in FIGS. 12, 13 and 14. The input drive shaft 120 is fixed with relation to the sun gear 54 by a collar 127 having a threaded aperture 128 which is configured to receive a set screw 129 that is tightened against the second end 124 of the input drive shaft 120 in assembly. Alternatively, the sun gear 54 can have a bearing member that defines a third one-way bearing for the bearing assembly 150. The third one-way bearing is contemplated to be configured in the same manner as bearing member 100, an oppositely configured with respect to bearing member 110. The input drive shaft 120 is contemplated to be received by the third one-way bearing, such that the planetary gear system 50 can remain stationary when the bearing assembly 150 is in a direct drive configuration, as further described below. The second end 124 of the input drive shaft 120 further includes a motor coupling portion 126 disposed at a distal most portion of the input drive shaft 120. The motor coupling portion 126 of the input drive shaft 120 is contemplated to couple to the motor 18 (FIGS. 1 and 2) of the blender 10, to power rotation of the input drive shaft 120 in opposed first and second directions. The first end 122 of the input drive shaft 120 is received within the receiving bore 116 of the bearing member 110 for rotation therein, as best shown in FIG. 14. In FIG. 6, the first end 122 of the input drive shaft 120 is contemplated to be received within the receiving bore 116 of the bearing member 110, such that the second end 124 of the input drive shaft 120 is accessible.

Figure 8:
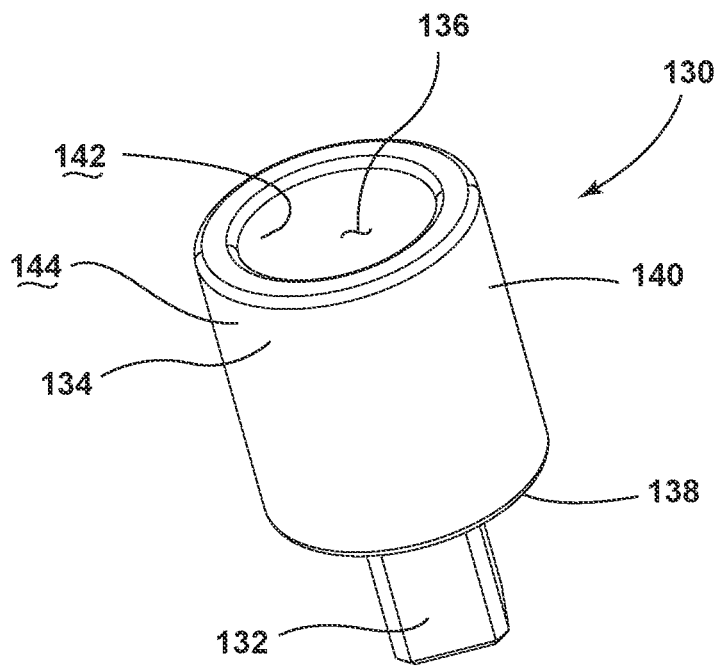
FIG. 8 is a bottom perspective view of an output drive shaft.
Figure 9:
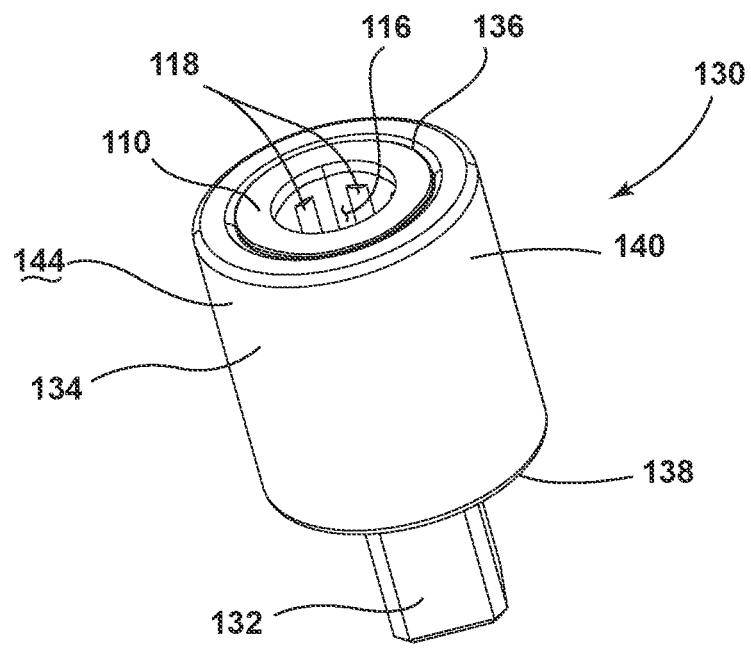
FIG. 9 is a bottom perspective view of the output drive shaft of FIG. 8 having a one-way bearing member coupled thereto.

With further reference to FIGS. 6 and 7, the bearing assembly 150 further includes the output drive shaft 130. The output drive shaft 130 includes first and second ends 132, 134 which may be referred to herein as first and second portions, upper and lower portions, or upper and lower engagement portions. The first end 132 of the output drive shaft 130 is shown in the form of a square drive member which is configured to operably engage and drive a blade assembly of a blender jar. The output drive shaft 130 is ultimately driven by the motor 18 (FIG. 2) and the input drive shaft 120 of the blender 10. The drive assembly 30 of the present concept allows for various speeds of rotation for the output drive shaft 130, as further described below. The second end 134 of the output drive shaft 130 includes a hollow interior cavity 136. In this way, is contemplated that the second end 134 of the output drive shaft 130 is a cylindrical member which defines a receiving well having a top wall 138 and a sidewall 140 which surrounds the hollow interior cavity 136. The first end 132 of the output drive shaft 130 extends upwardly from the top wall 138. With specific reference to FIG. 8, the sidewall 140 of the receiving well includes inner and outer surfaces 142, 144. In assembly, the bearing member 110 is received within the hollow interior cavity 136 of the output drive shaft 130, as shown in FIGS. 9 and 14, for rotation therewith. Thus, in the embodiment of FIG. 9, it is contemplated that the outer surface 112A of the bearing member 110 is engaged with the inner surface 142 of the sidewall 140 of the output drive shaft 130, for rotation therewith, as best shown in FIG. 14.

With further reference to FIGS. 6 and 7, the bearing member 100 surrounds the second end 134 of the output drive shaft 130, such that the outer surface 144 of the second end 134 of the output drive shaft 130 is engaged with the clutch mechanism 104 of the bearing member 100 for selective rotation therewith. Said differently, the second end 134 of the output drive shaft 130 is received within the receiving bore 106 of the bearing member 100 in assembly, as best shown in FIG. 14. In this way, and is contemplated that the output drive shaft 130 is engaged with the sprags 108 of the bearing member 100, such that rotation of the bearing member 100 may drive rotation of the output drive shaft 130 when the bearing member 100 rotates in a first direction, and the second end 134 of the output drive shaft 130 may rotate freely within the receiving bore 106 of the bearing member 100 when the output drive shaft 130 is rotating in a second direction or the bearing member 100 is rotating around the output drive shaft 130 in a second direction that is opposed to the first direction, or when both component parts are rotating in the second direction.

As noted above, the first end 122 of the input drive shaft 120 is received within the receiving bore 116 of the bearing member 110 for rotation therein, as best shown in FIG. 14. As the bearing member 110 is contemplated to be a one-way bearing member, the first end 122 of the input drive shaft 120 may freely rotate within the receiving bore 116 of the bearing member 110 when the input drive shaft 120 rotates in a first direction, and the first end 122 of the input drive shaft 120 may wedgingly engage the clutch mechanism 114 of the bearing member 110 when the first end 122 of the input drive shaft 120 rotates in a second direction that is opposed to the first direction. Thus, when the input drive shaft 120 rotates in a second direction, the output drive shaft 130 is directly driven by the input drive shaft 120 through the bearing member 110, thereby providing a direct drive configuration having a 1:1 gearing ratio.

Figure 10:
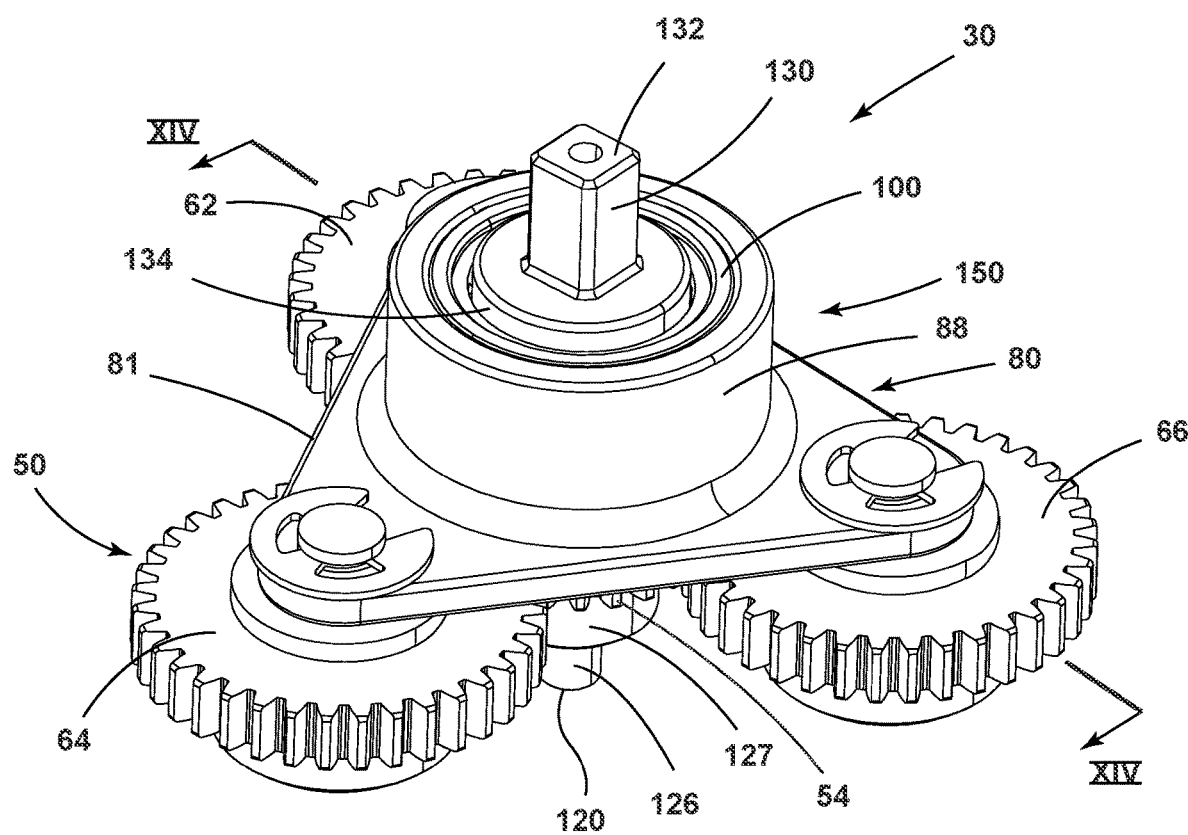
FIG. 10 is a top perspective view of the drive assembly of FIG. 3.
Figure 11:
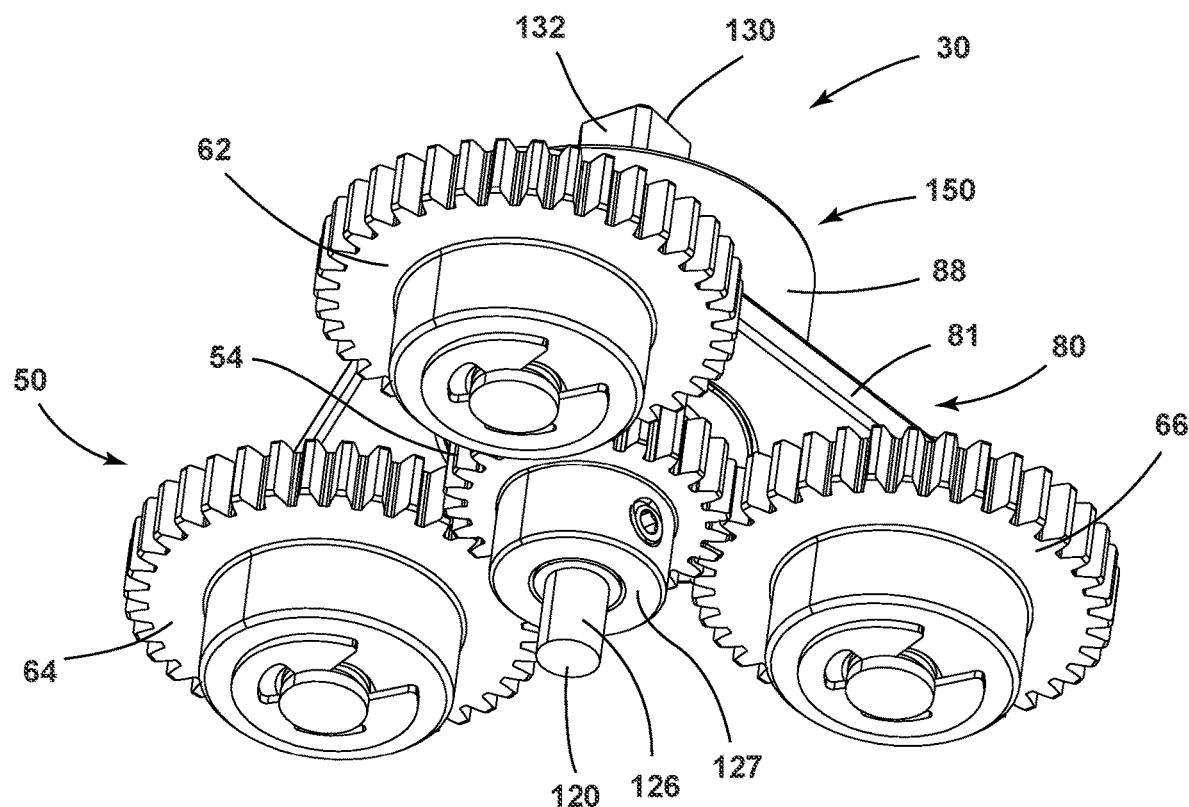
FIG. 11 is a bottom perspective view of the drive assembly of FIG. 10.

FIGS. 10 and 11 show the assembled drive assembly 30 from a top perspective view (FIG. 10) and a bottom perspective view (FIG. 11), with the ring gear 52 shown in FIGS. 6 and 7 removed. As shown from the top perspective view of FIG. 10, the first end 132 of the output drive shaft 130 is shown extending upwardly from the bearing assembly 150. The planetary gear system 50, less the ring gear 52, is shown coupled to the carrier member 80 at planet gears 62, 64 and 66 for rotation of the carrier member 80 of the bearing assembly 150. As shown from the bottom perspective view of FIG. 11, the motor coupling portion 126 of the input drive shaft 120 is shown downwardly extending from the bearing assembly 150 for coupling to a motor of an appliance.

Movement of the component parts of the drive assembly 30 will now be described with reference to FIGS. 12 and 13. With specific reference to FIG. 12, a rotational input on the input drive shaft 120 is indicated in a first direction by arrow R1. In the embodiment shown in FIG. 12, the first direction indicated by arrow R1 is a clockwise direction. As coupled to the second end 124 of the input drive shaft 120, the sun gear 54 also rotates in the direction as indicated by arrow R1. Rotation of the sun gear 54 imparts rotation of the planet gears 62, 64 and 66 in the directions as indicated by arrows R2. While the planet gears 62, 64 and 66 rotate or spin in the direction as indicated by arrows R2, the planet gears 62, 64 and 66 also turn and move along the ring gear 52 in the direction as indicated by arrow R3. The turning of the planet gears 62, 64 and 66 provides for rotation of the connecting rods 72, 74 and 76 coupled thereto, which further turn the carrier member 80 in the direction as indicated by arrow R4. It is noted that the directions indicated by arrows R3 and R4 are also clockwise directions which may be described herein as rotation in the first direction. As noted above, the bearing member 100 is received within the receiving bore 90 of the carrier member 80 for rotation therewith. In this way, the bearing member 100 rotates in the clockwise direction as indicated by arrow R5 when a clockwise rotational input is provided on the input drive shaft 120 in the direction as indicated by arrow R1. As noted above, the output drive shaft 130 is engaged with the sprags 108 of the clutch mechanism 104 of the bearing member 100 when the bearing member 100 rotates in the first direction, such that rotation of the bearing member 100 in the first direction drives rotation of the output drive shaft 130 through the planetary gear system 50 at a reduced rotational speed, in an opposite direction and with increased torque as compared to the 1:1 speed and direction of the direct drive configuration described above. Through the planetary gear system 50, the output drive shaft 130 is contemplated to rotate at a 1:5 gearing ratio in the clockwise direction as indicated by arrow R6 relative to the input drive shaft 120. Said differently, the input drive shaft 120 drives the output drive shaft 130 through the planetary gear system 50 at a 5:1 gearing ratio of the input drive shaft 120 to the output drive shaft 130.

With further reference to FIG. 12, rotation of the input drive shaft 120 in the rotational direction indicated by arrow R1 is contemplated to provide for a freely rotating first end 122 of the input drive shaft 120 within the receiving bore 116 of the bearing member 110 in which the first end 122 of the input drive shaft 120 is received in assembly. Thus, the first end 122 of the input drive shaft 120 does not engage the clutch mechanism 114 of the bearing member 110 when the input drive shaft 120 is rotating in the first direction or clockwise direction indicated by arrow R1.

With specific reference to FIG. 13, a rotational input on the input drive shaft 120 is indicated in a second direction by arrow R10. In the embodiment shown in FIG. 13, the second direction indicated by arrow R10 is a counter-clockwise direction. Thus, the motor 18 (FIGS. 1 and 2) is configured to rotate the input drive shaft 120 in opposed first and second directions (i.e. clockwise and counter-clockwise) as indicated by arrows R1 (FIG. 12) and arrow R10 (FIG. 13). As coupled to the second end 124 of the input drive shaft 120, the sun gear 54 also rotates in the direction as indicated by arrow R10. Rotation of the sun gear 54 imparts a rotation of the planet gears 62, 64 and 66 in the directions as indicated by arrows R12. While the planet gears 62, 64 and 66 rotate or spin in the direction as indicated by arrows R12, the planet gears 62, 64 and 66 also turn and move along the ring gear 52 in the direction as indicated by arrow R13. The turning of the planet gears 62, 64 and 66 provides for rotation of the connecting rods 72, 74 and 76, which further turn the carrier member 80 in the direction as indicated by arrow R14. It is noted that the directions indicated by arrows R13 and R14 are also counter-clockwise directions which may be described herein as rotation in the second direction. As noted above, the bearing member 100 is received within the receiving bore 90 of the carrier member 80 for rotation therewith. In this way, the bearing member 100 rotates in the counter-clockwise direction as indicated by arrow R15 when a counter-clockwise rotational input is provided on the input drive shaft 120 in the direction as indicated by arrow R10. As noted above, the output drive shaft 130 is engaged with the sprags 108 of the bearing member 100 when the bearing member 100 rotates in the first direction, but is disengaged, or spins freely, within the receiving bore 106 of the bearing member 100 when the bearing member 100 rotates in the counter-clockwise direction. In this way, when rotating in the second or counter-clockwise direction, the bearing member 100 is not driving rotation of the output drive shaft 130. Rather, the output drive shaft 130 is in the direct drive configuration described above, wherein the output drive shaft 130 is driven directly by the input drive shaft 120 in a 1:1 gearing ratio of the input drive shaft 120 to the output drive shaft 130.

With further reference to FIG. 13, rotation of the input drive shaft 120 in the rotational direction indicated by arrow R10 is contemplated to be engaged within the receiving bore 116 of the bearing member 110 in which the first end 122 of the input drive shaft 120 is received in assembly. Thus, the first end 122 of the input drive shaft 120 engages the clutch mechanism 114 of the bearing member 110 when the input drive shaft 120 is rotating in the second direction or counter-clockwise direction indicated by arrow R10 to further drive the output drive shaft 130.

As noted above, the rotation of the input drive shaft 120 in the second or counter-clockwise direction leads to the bearing member 100 also rotating in the second or counter-clockwise direction as indicated by arrow R15. With the input drive shaft 120 rotating in second or counter-clockwise direction the output drive shaft 130 rotates in the same counter-clockwise direction at a greater speed, as drive directly by the input drive shaft 120, within the receiving bore 106 of the bearing member 100. This is because the output drive shaft 130 does not engage the clutch mechanism 104 of the bearing member 100 when the output drive shaft 130 rotates in the second or counter-clockwise direction as indicated by arrow R16, and therefore the output drive shaft 130 can rotate in the second direction at a greater speed than the rotation of the bearing member 100 as directly driven by the input drive shaft 120 through the inner bearing member 110 in the direct drive configuration. Thus, the second end 134 of the output drive shaft 130 may rotate at a greater rotational speed within the receiving bore 106 of the bearing member 100 as compared to a rotational speed of the bearing member 100 rotating around the second end 134 of the output drive shaft 130.

While the directions of rotational inputs R1 and R10 in FIGS. 12 and 13 are shown as clockwise and counter-clockwise directions, respectively, it is contemplated that the present concept can be provided in an opposite configuration wherein the rotational inputs R1 and R10 may be provided in clockwise and counter-clockwise directions, respectively. In such a configuration, the bearing members 100 and 110 would be configured to engage rotating members in an opposite manner as compared to that described above. In any configuration of the present concept, the bearing members 100 and 110 are one-way bearing members that are oppositely configured with respect to one another. As used herein, the term "oppositely configured" is meant to define a set of bearing members, wherein one bearing member allows a rotating member to spin freely in a first direction and engages the rotating member for synchronized rotation therewith in the second direction, while the other bearing member allows a rotating member to spin freely in the second direction and engages the rotating member for synchronized rotation therewith in the first direction, wherein the first and second directions are opposed to one another. This configuration remains consistent whether the bearing member is rotating around a stationary member, a rotating member is received inside a receiving bore of a stationary bearing member, or a rotating member is received inside a receiving bore of a rotating bearing member.

Referring now to FIG. 14, the bearing member 100 is shown received within the receiving bore 90 of the carrier member 80. Thus, the outer surface 102A (FIG. 7) of the bearing member 100 is engaged with the inner surface 92 (FIG. 7) of the receiving bore 90 of the carrier member 80, for rotation therewith. Further, the bearing member 100 surrounds the second end 134 of the output drive shaft 130, such that the outer surface 144 (FIG. 7) of the second end 134 of the output drive shaft 130 is engaged with the clutch mechanism 104 of the bearing member 100 for selective rotation therewith. As further shown in FIG. 14, the bearing member 110 is received within the hollow interior cavity 136 of the output drive shaft 130, such that the outer surface 112A (FIG. 7) of the bearing member 110 is engaged with the inner surface 142 of the sidewall 140 of the second end 134 of the output drive shaft 130, for rotation therewith. As further shown in FIG. 14, the first end 122 of the input drive shaft 120 is received within the receiving bore 116 of the bearing member 110 for rotation therein, while the second end 124 of the input drive shaft 120 is received within the centrally disposed aperture 56 (FIG. 7) of the sun gear 54 for rotation therewith.

As noted above, the drive assembly 30 of the present concept is configured for both direct drive and indirect drive configurations. In the direct drive configuration the output drive shaft 130 is driven directly by the input drive shaft 120 in a 1:1 gearing ratio of the input drive shaft 120 to the output drive shaft 130. This direct drive confirmation provides for a higher rotational speed of the output drive shaft 130 as compared to the indirect drive configuration. When in the direct drive configuration, the torque of the output drive shaft 130 is equal to the torque of the motor 18 (FIG. 2), in the rotational speed of the output drive shaft 130 is equal to the rotational speed of the motor 18. Through the planetary gear system 50, the output drive shaft 130 is contemplated to rotate at a 1:5 gearing ratio in the clockwise direction as indicated by arrow R6 in FIG. 12 relative to the input drive shaft 120. Said differently, the input drive shaft 120 drives the output drive shaft 130 through the planetary gear system 50 at a 5:1 gearing ratio of the input drive shaft 120 to the output drive shaft 130 in the indirect drive configuration. When in the indirect drive configuration, the torque of the output drive shaft 130 is contemplated to be five times that of the torque of the motor 18 (FIG. 2), and the rotational speed of the output drive shaft 130 is contemplated to be ⅕ of the speed of the motor 18. So, while the direct drive configuration provides for a faster rotational speed, the planetary gear system 50 provides for higher torque. Thus, the increased gear ratio of 5:1 from 1:1 of the input drive shaft 120 to the output drive shaft 130 provides for higher torque setting of the appliance. It is contemplated that the motor 18 may rotate the input drive shaft 120 in the opposed first and second directions at the same rotational speed to achieve the rotational speeds and torque outputs described above.

According to one aspect of the disclosure, a drive assembly includes an output drive shaft having a receiving well with an outer surface and an interior cavity. An inner bearing member is received in the interior cavity of the output drive shaft. The inner bearing member is a one-way bearing member having a receiving bore. An outer bearing member includes a receiving bore. The receiving well of the output drive shaft is received in the receiving bore of the outer bearing member. The outer bearing member is a one-way bearing member that is oppositely configured relative to the inner bearing member. An input drive shaft includes first and second portions. The first portion is received in the receiving bore of the inner bearing member. A planetary gear system includes a sun gear that is operably coupled to the second portion of the input drive shaft and is gearingly engaged with a ring gear through a plurality of planet gears. A carrier member is operably coupled to the plurality of planet gears for rotation therewith. The carrier member includes a receiving bore in which the outer bearing member is received for rotation therewith.

According to another aspect of the disclosure, the input drive shaft rotates in opposed first and second directions.

According to another aspect of the disclosure, the input drive shaft directly drives rotation of the output drive shaft when the input drive shaft rotates in the second direction in a direct drive configuration.

According to another aspect of the disclosure, the planetary gear system drives rotation of the output drive shaft when the input drive shaft rotates in the first direction in an indirect drive configuration.

According to yet another aspect of the disclosure, the direct drive configuration provides a 1:1 gearing ratio of the input drive shaft to the output drive shaft, and further wherein the indirect drive configuration provides a 5:1 gearing ratio of the input drive shaft to the output drive shaft.

According to one aspect of the disclosure, a drive assembly includes an output drive shaft configured for rotation in opposed first and second directions. The output drive shaft includes first and second portions. The second portion of the output drive shaft includes a receiving well defined by a sidewall with inner and outer surfaces surrounding a hollow interior cavity. A first bearing member is received within the hollow interior cavity of the output drive shaft. The first bearing member includes an outer race operably coupled to the inner surface of the sidewall of the second portion of the output drive shaft for rotation therewith. The first bearing member includes a receiving bore. An input drive shaft includes first and second portions. The first portion of the input drive shaft is received in the receiving bore of the first bearing member for rotation therein in opposed first and second directions. The first portion of the input drive shaft spins freely within the receiving bore of the first bearing member when the input drive shaft rotates in the first direction. The input drive shaft directly drives rotation of the first bearing member when the input drive shaft rotates in the second direction. A second bearing member includes an outer race surrounding a receiving bore. The second bearing member is operable for rotation between opposed first and second directions. The second portion of the output drive shaft is received within the receiving bore of the second bearing member for rotation therein. The second portion of the output drive shaft spins freely within the receiving bore of the second bearing member when the second bearing member and the output drive shaft rotate in the second direction. The second bearing member drives rotation of the output drive shaft when the second bearing member rotates in the first direction.

According to another aspect of the disclosure, a gear system is operably coupled to the input drive shaft and includes a carrier member with a receiving bore. The second bearing member is received within the receiving bore of the carrier member of the gear system for rotation therewith.

According to another aspect of the disclosure, the gear system drives rotation of the second bearing member and the output drive shaft when the carrier member of the gear system rotates in the first direction.

According to another aspect of the disclosure, the second bearing member freely rotates around the second portion of the output drive shaft in the second direction when the carrier member of the gear system rotates in the second direction.

According to yet another aspect of the disclosure, the second portion of the output drive shaft rotates at a greater rotational speed within the receiving bore of the second bearing member as compared to a rotational speed of the second bearing member rotating around the second portion of the output drive shaft.

According to one aspect of the disclosure, an output drive shaft includes a receiving well with a hollow interior cavity that is defined by a sidewall having inner and outer surfaces. A first one-way bearing is received in the hollow interior cavity of the output drive shaft. The first one-way bearing includes a receiving bore. An outer surface of the first one-way bearing is engaged with the inner surface of the sidewall of the output drive shaft for rotation therewith. A second one-way bearing includes a receiving bore. The receiving well of the output drive shaft is received within the receiving bore of the second one-way bearing. An input drive shaft includes an upper portion thereof received in the receiving bore of the first one-way bearing. The input drive shaft is configured for rotation in opposed first and second directions. The first one-way bearing drives rotation of the output drive shaft at a first rotational speed when the input drive shaft rotates in the second direction. The second one-way bearing drives rotation of the output drive shaft at a second rotational speed which is less than the first rotational speed when the input drive shaft rotates in the first direction.

According to another aspect of the disclosure, the receiving well of the output drive shaft spins freely in the second direction within the receiving bore of the second one-way bearing when the input drive shaft rotates in the second direction.

According to another aspect of the disclosure, the upper portion of the input drive shaft spins freely in the receiving bore of the first one-way bearing when the input drive shaft rotates in the first direction.

According to another aspect of the disclosure, the input drive shaft rotates at a same rotational speed in both the first and second directions.

According to another aspect of the disclosure, a planetary gear system includes a sun gear operably coupled to the input drive shaft for rotation therewith. The sun gear is gearingly engaged with a ring gear through a plurality of planet gears.

According to another aspect of the disclosure, a carrier member is operably coupled to the plurality of planet gears for rotation therewith. The carrier member includes a receiving bore.

According to another aspect of the disclosure, the second one-way bearing is received in the receiving bore of the carrier member for rotation therewith.

According to another aspect of the disclosure, rotation of the input drive shaft in the second direction provides for a direct drive configuration with a 1:1 gearing ratio between the input drive shaft and the output drive shaft.

According to another aspect of the disclosure, rotation of the input drive shaft in the first direction provides for an indirect drive configuration with a 5:1 gearing ratio between the input drive shaft and the output drive shaft.

According to another aspect of the disclosure, a blade assembly is operably coupled to the output drive shaft for rotation therewith.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A drive assembly, comprising:
   an output drive shaft having a lower engagement portion with a receiving well defined by a top wall and a sidewall downwardly extending therefrom, wherein the sidewall surrounds a downwardly opening interior cavity and includes inner and outer surfaces, and further wherein the output driveshaft includes an upper engagement portion upwardly extending from the top wall of the lower engagement portion;
   an inner bearing member received in the interior cavity of the output drive shaft, wherein the inner bearing member is a one-way bearing member having a receiving bore;
   an outer bearing member having a receiving bore, wherein the receiving well of the output drive shaft is received in the receiving bore of the outer bearing member, and further wherein the outer bearing member is a one-way bearing member that is oppositely configured relative to the inner bearing member;
   an input drive shaft having first and second portions, wherein the first portion is received in the receiving bore of the inner bearing member;
   a planetary gear system having a sun gear operably coupled to the second portion of the input drive shaft and gearingly engaged with a ring gear through a plurality of planet gears; and
   a carrier member operably coupled to the plurality of planet gears for rotation therewith, wherein the carrier member includes a receiving bore in which the outer bearing member is received for rotation therewith.

2. The drive assembly of claim 1, wherein the input drive shaft rotates in opposed first and second directions.

3. The drive assembly of claim 2, wherein the input drive shaft directly drives rotation of the output drive shaft when the input drive shaft rotates in the second direction in a direct drive configuration.

4. The drive assembly of claim 3, wherein the planetary gear system drives rotation of the output drive shaft when the input drive shaft rotates in the first direction in an indirect drive configuration.

5. The drive assembly of claim 4, wherein the direct drive configuration provides a 1:1 gearing ratio of the input drive shaft to the output drive shaft, and further wherein the indirect drive configuration provides an increased gearing ratio of the input drive shaft to the output drive shaft.

6. A drive assembly, comprising:
   an output drive shaft configured for rotation in opposed first and second directions and having upper and lower engagement portions, wherein the lower engagement portion of the output drive shaft includes a receiving well that opens downwardly and is defined by a top wall and a sidewall with inner and outer surfaces surrounding a hollow interior cavity, wherein the upper engagement portion of the output drive shaft extends upwardly from the top wall of the lower engagement portion;

a first bearing member received within the hollow interior cavity of the output drive shaft, wherein the first bearing member includes an outer race operably coupled to the inner surface of the sidewall of the lower engagement portion of the output drive shaft for rotation therewith, and further wherein the first bearing member includes a receiving bore;

an input drive shaft having first and second portions, wherein the first portion of the input drive shaft is received in the receiving bore of the first bearing member for rotation therein in opposed first and second directions, and further wherein the first portion of the input drive shaft spins freely within the receiving bore of the first bearing member when the input drive shaft rotates in the first direction, and further wherein the input drive shaft directly drives rotation of the first bearing member when the input drive shaft rotates in the second direction; and a second bearing member having an outer race surrounding a receiving bore, wherein the second bearing member is operable for rotation between opposed first and second directions, wherein the lower engagement portion of the output drive shaft is received within the receiving bore of the second bearing member for rotation therein, and further wherein the lower engagement portion of the output drive shaft spins freely within the receiving bore of the second bearing member when the second bearing member and the output drive shaft rotate in the second direction, and further wherein the second bearing member drives rotation of the output drive shaft when the second bearing member rotates in the first direction.

7. The drive assembly of claim 6, including:
a gear system operably coupled to the input drive shaft and having a carrier member with a receiving bore, wherein the second bearing member is received within the receiving bore of the carrier member of the gear system for rotation therewith.

8. The drive assembly of claim 7, wherein the gear system drives rotation of the second bearing member and the output drive shaft when the carrier member of the gear system rotates in the first direction.

9. The drive assembly of claim 8, wherein the second bearing member freely rotates around the lower engagement portion of the output drive shaft in the second direction when the carrier member of the gear system rotates in the second direction.

10. The drive assembly of claim 9, wherein the lower engagement portion of the output drive shaft rotates at a greater rotational speed within the receiving bore of the second bearing member as compared to a rotational speed of the second bearing member rotating around the lower engagement portion of the output drive shaft.

11. A drive assembly, comprising:
an output drive shaft having a lower engagement portion with a receiving well defined by a top wall and a sidewall, wherein the sidewall surrounds a hollow interior cavity and includes inner and outer surfaces, and further wherein the output driveshaft includes an upper engagement portion upwardly extending from the top wall of the lower engagement portion;

a first one-way bearing received in the hollow interior cavity of the output drive shaft, wherein the first one-way bearing includes a receiving bore, and further wherein an outer surface of the first one-way bearing is engaged with the inner surface of the sidewall of the receiving well of the output drive shaft for rotation therewith;

a second one-way bearing having a receiving bore, wherein the receiving well of the output drive shaft is received within the receiving bore of the second one-way bearing; and an input drive shaft having an upper portion thereof received in the receiving bore of the first one-way bearing, wherein the input drive shaft is configured for rotation in opposed first and second directions, and further wherein the first one-way bearing drives rotation of the output drive shaft at a first rotational speed when the input drive shaft rotates in the second direction, and further wherein the second one-way bearing drives rotation of the output drive shaft at a second rotational speed which is less than the first rotational speed when the input drive shaft rotates in the first direction.

12. The drive assembly of claim 11, wherein the receiving well of the output drive shaft spins freely in the second direction within the receiving bore of the second one-way bearing when the input drive shaft rotates in the second direction.

13. The drive assembly of claim 12, wherein the upper portion of the input drive shaft spins freely in the receiving bore of the first one-way bearing when the input drive shaft rotates in the first direction.

14. The drive assembly of claim 11, wherein the input drive shaft rotates at a same rotational speed in both the first and second directions.

15. The drive assembly of claim 11, including:
a planetary gear system having a sun gear operably coupled to the input drive shaft for rotation therewith, wherein the sun gear is gearingly engaged with a ring gear through a plurality of planet gears.

16. The drive assembly of claim 15, including:
a carrier member operably coupled to the plurality of planet gears for rotation therewith, wherein the carrier member includes a receiving bore.

17. The drive assembly of claim 16, wherein the second one-way bearing is received in the receiving bore of the carrier member for rotation therewith.

18. The drive assembly of claim 17, wherein rotation of the input drive shaft in the second direction provides for a direct drive configuration with a 1:1 gearing ratio between the input drive shaft and the output drive shaft.

19. The drive assembly of claim 18, wherein rotation of the input drive shaft in the first direction provides for an indirect drive configuration with an increased gearing ratio between the input drive shaft and the output drive shaft.

20. The drive assembly of claim 11, including:
a blade assembly operably coupled to the upper engagement portion of the_output drive shaft for rotation therewith.

* * * * *